Sept. 8, 1964  H. J. SCHWERDHÖFER  3,147,641
DUAL SPEED HUB
Filed July 25, 1962  2 Sheets-Sheet 1

INVENTOR:
HANS JOACHIM SCHWERDHÖFER

Sept. 8, 1964  H. J. SCHWERDHÖFER  3,147,641
DUAL SPEED HUB

Filed July 25, 1962  2 Sheets-Sheet 2

INVENTOR:
HANS JOACHIM SCHWERDHÖFER

By Richard Ernst
Agt

2

United States Patent Office 3,147,641
Patented Sept. 8, 1964

3,147,641
DUAL SPEED HUB
Hans Joachim Schwerdhöfer, Schweinfurt (Main), Germany, assignor to Fichtel & Sachs A.G., Schweinfurt (Main), Germany, a corporation of Germany
Filed July 25, 1962, Ser. No. 212,395
Claims priority, application Germany Aug. 2, 1961
9 Claims. (Cl. 74—750)

This invention relates to a hub for the driven wheel of bicycles, motorcycles, and the like, and more particularly to a dual speed hub in which the speed change is effected by an internal speed-changing mechanism actuated by reverse pressure on the driven input member of the hub.

In known dual speed hubs, motive power is transmitted from pedals or an engine to a sprocket wheel which is fixedly connected to a driver member that is rotatable about a stationary hub shaft secured to the bicycle frame. The driver member is partly enveloped by a hub shell. A portion of the driver member projects beyond the hub shell and carries the sprocket wheel over which a drive chain is trained. The driver member is disposed between the sprocket wheel and planetary gearing means which consist essentially of a sun wheel, a planet wheel carrier, and planet wheels. The planetary gearing transmits rotary motion of the driver member to the hub shell. Wire spokes on the hub shell carry the rim of the driven bicycle wheel.

Bicycle hubs in which a speed change is initiated by back pedaling are known. In a known construction of a multiple speed hub having two aggregates of driving means, the speed change is effected over a system of cams and eccentrics, whereby this system acts upon a pawl coupling. This construction has the disadvantage of being complicated and including parts which are difficult to manufacture. Other known constructions employ two drive cones one of which is movable on a flat thread of a cup-shaped wheel of a planetary gearing, while the other drive cone moves on a flat thread of a planet wheel carrier. A speed change mechanism either prevents the cone on the cup-shaped wheel from engaging a hub shell or causes that cone to engage the hub shell, depending on the speed control position. If the high-speed cone is engaged, the other cone drags along on the hub shell since it rotates at a slower speed due to the transmission ratio. The surfaces of the cones are subject to high wear, which is a great disadvantage. These constructions, too, are complicated, requiring two cones with flat threads, two large driving members with flat threads, an additional locking mechanism, as well as friction and clamping springs. Insofar as flat threads are used for the speed change, it is the number of threads which determines the rotary angle, that is, the speed change angle, on a toothed rim, which angle, because of the limited number of threads, will be correspondingly great.

The present invention aims at eliminating the disadvantages of the known constructions and providing an improved construction.

These objects and such other objects of the invention as will be apparent from the following description are achieved by providing a dual speed hub for bicycles, motorcycles, and the like, that includes a driver member, a hub shell, and as power transmission elements between the driver member and the hub shell planetary gearing means, a speed-changing member, a coupling member, an interior driver member, and driving means immediately acting upon the hub shell. A member of the planetary gearing, for instance, a cup-shaped wheel or a part connected thereto, and the speed-changing member are provided with toothed or cam faces. These faces engage each other as long as they rotate in forward direction. Upon reverse rotation of the planetary gearing, the speed-changing member moves axially away. This axial movement is due to the formation of the toothed or cam faces. The coupling member is connected, and relatively movable with respect, to the interior driver member, and is further connected over either of two couplings with the driver member and the referred to gearing member, respectively. The driver member may be formed as a planet wheel carrier or a cup-shaped wheel of the planetary gearing. One of said toothed or cam faces is provided either on the cup-shaped wheel or the aforesaid part connected to the cup-shaped wheel. As far as hubs with back pedaling speed change mechanisms are concerned, offering two output speeds, one equal to, and one greater than, the input speed, the hub of my present invention has only a single aggregate of driving means and thus distinguishes from all known constructions. It will be appreciated that this reduces the number of parts and the space needed, and renders the manufacture of my novel hub more economical and the operation safer. With hubs with coaster brake, no additional circumferential lost motion coupling is needed. A significant contribution to the simplicity of the present hub is to be derived from the fact that the toothed or cam faces referred to hereinbefore may be provided on the cup-shaped wheel which is in any case needed in hubs for driven wheels, or on a part connected to such cup-shaped wheel.

The specification is accompanied by drawings which show by way of example a number of embodiments of the invention and in which.

Figure 1:
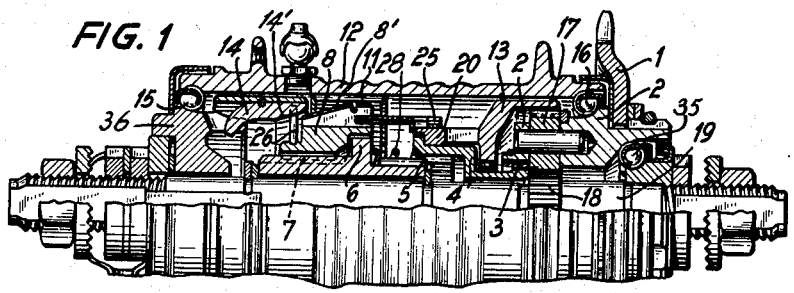
FIG. 1 is a partly sectioned elevation of a dual speed hub according to the invention, designed for direct and high-speed gear and shown to be in direct gear or set for low-speed operation, one half of the hub being shown in section.

Referring to the drawings in greater detail now, and initially to FIG. 1, there is shown a rear wheel hub of a bicycle of conventional external appearance. The working elements of the hub are mounted on a stationary shaft 19 which is adapted to be clamped in a fork of a bicycle frame. Most of the hub elements are enclosed by a hub shell 12 which extends coaxially with the shaft 19 and is rotatable. Over a sprocket 1 which projects beyond the hub shell a drive chain is trained. Motive power is transmitted from pedals or an engine to the sprocket which is fixedly connected to a driver member 2 that is rotatable about the shaft 19. The driver member 2 forms an outer race for a ball bearing 35 and an inner race for a ball bearing 16. An axially spaced bearing member 36 forms an inner race for a ball bearing 15.

Figure 8:
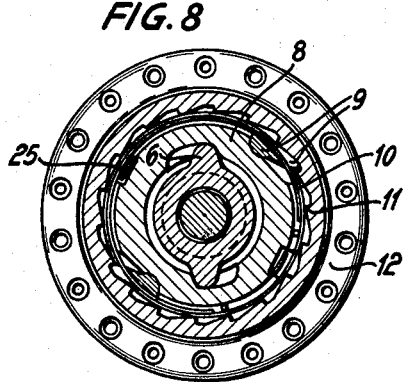
FIG. 8 is a section taken in the plane of the line VIII—VIII of FIG. 2.

In the embodiment shown, the driver member 2 is formed as a planet wheel carrier of a planetary gearing and is connected to a coupling member 4 by means of a coupling 3 which may be formed, for instance, by axially extending teeth, and the coupling member 4 is connected to an interior driver member 6 over a coupling 5 for axial movements. A brake cone 8 which may be disposed above or beside the interior driver member 6 is shown to be connected to the interior driver member by a thread 7 or the like, and serves either as a carrier for any driving means acting on the hub shell, or as an intermediate part between the interior driver member and such driving means. The driving means is constituted by a pawl-and-ratchet device and comprises pawls 9, a spring ring 10, a ratchet 11 (shown in FIG. 8) and transmits motion to the hub shell 12. When torque developed by the chain engaging the sprocket 1 is transmitted during forward pedaling, a cup-shaped wheel 13 driven by planet wheels 17 rotates at a higher speed but idles. When braking is initiated, the brake cone 8 is moved by means of the thread 7 toward a brake sleeve 14, and an inclined face 8' of the brake cone 8 will press tightly against a matingly inclined face 14' of the brake sleeve 14, causing the latter to act upon the hub shell 12 as a brake. In order to prevent the brake cone 8 from turning while axially moving toward the brake sleeve 14 during the braking action, I provide a friction spring 26 which acts like a clamping spring.

During freewheeling, it is only the hub shell 12 which runs on freely on the ball bearings 15 and 16. The driving means 9, 10 and 11 is inactive. In fact, all working parts of the rear hub are at a standstill. On pushing the bicycle backward, the driving means 9, 10, 11 effects a safe release of the brake and thus prevents an increase of the braking action.

Figure 2:
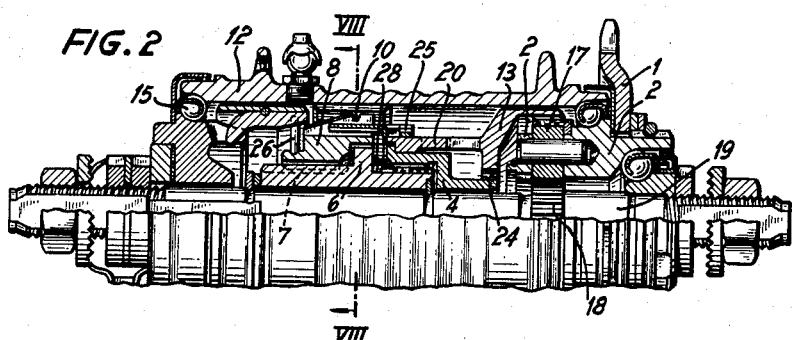
FIG. 2 shows the hub of FIG. 1, set for high-speed operation.
Figure 5:
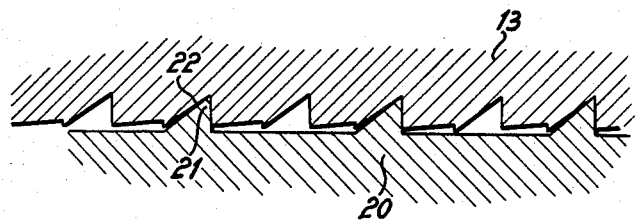
FIG. 5 shows a development of toothed faces of a cup-shaped wheel and a speed-changing member, the toothed faces engaging each other, and their relative position corresponding to FIG. 1.
Figure 6:
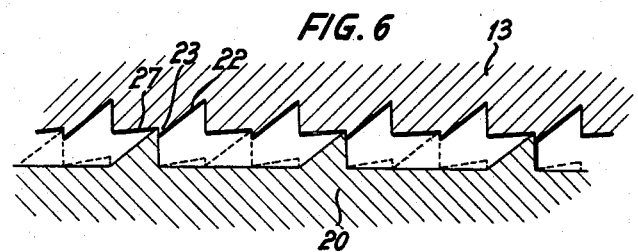
FIG. 6 shows a development of the toothed faces of FIG. 5 in disengagement, with the speed-changing member being moved away from the cup-shaped wheel, and the position shown corresponding to FIG. 2.

FIG. 2 shows the hub of FIG. 1 upon shifting gears. The shifting is done by back pedaling. The sprocket 1 is turned in reverse direction, and this reverse movement is transmitted to the driver member or planet wheel carrier 2, to the planet wheels 17 which mesh with a sun wheel 18 fixed on the shaft 19, and to the cup-shaped wheel 13. The latter runs at a higher speed. At the same time, a speed-changing member 20 with teeth 21 (see FIG. 5) is moved sideways by ascending faces 22 of teeth 23 of the cup-shaped wheel 13. While this axial move takes place, the coupling member 4 is also axially moved, the coupling 3 between the planet wheel carrier 2 and the coupling member 4 is disengaged, and the coupling member 4 engages instead the cup-shaped wheel 13 by means of a coupling 24. Upon the move of the speed-changing member 20, the teeth 21 of this member and the teeth 23 of the cup-shaped wheel 13 assume a relative position which is shown in FIG. 6.

To make sure that the speed-changing member 20 will not turn backward during the gear shift, suitable catch means are provided, for instance, a clamping spring 25. Such catch may be secured in grooves of the brake cone 8 which, in turn, is secured against turning during reverse motion by the friction spring 26.

If the speed condition shown in FIG. 1 is to be restored, the planet wheel carrier 2 is again to be turned backward by backward pedaling. Then, faces 27 of the teeth of the cup-shaped wheel 13 slide along the teeth 21 of the speed-changing member 20 (see again FIG. 6) until a compression spring 28 can urge the coupling member 4 and the speed control member 20 into their relative position of FIG. 1 and thus reestablish the starting condition.

Figure 3:
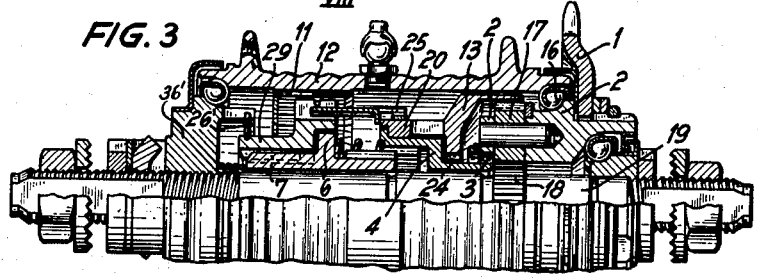
FIG. 3 shows one half of a section of another embodiment of the invention, the hub being again designed for direct and high-speed gear and being shown in direct gear.

FIG. 3 shows a dual speed hub without coaster brake. The operation of the hub and speed change is the same as in the construction of FIGS. 1 and 2. To prevent the bicycle rider, whenever he changes speed, from a continued speed change there is a lock 29 provided. This lock is supported by an interior driver member 6 and connected thereto, for instance, by a thread 7. On turning the planet wheel carrier 2 backward, the interior driver member 6 will also turn, depending on the speed set. Being prevented from turning by a friction spring 26', the lock 29 is moved axially by the thread 7 until it abuts against a bearing member 36'. Until this abutting position of the lock 29 is reached no other speed change can be effected. Another speed change is only possible after a forward movement of the hub has been effected. The lock 29 carries the driving means acting upon the hub shell 22, which consists of pawls 9, friction spring 10, and ratchet 11. The driving means may be provided, at least partly, in the hub shell 12 as well, and such driving means may also be used in other forms.

Figure 4:
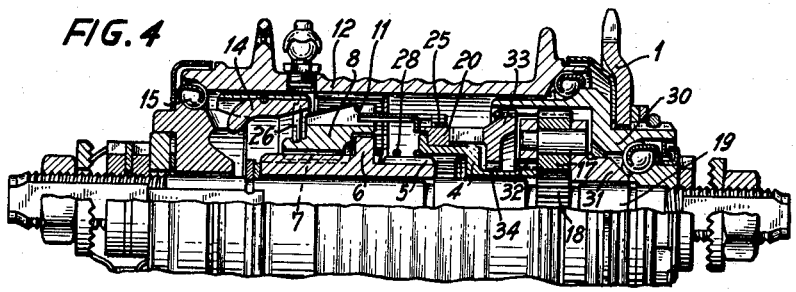
FIG. 4 shows a further embodiment of the invention, the hub being designed for direct and low-speed gear.

In FIG. 4 a dual speed hub is shown which can be set for a speed equal to the input speed and a lower transmission ratio. The hub of FIG. 4 differs from that of FIGS. 1 and 2 by the low speed arrangement. The driver member, in the embodiment of FIG. 4, is not formed as a planet wheel carrier but a cup-shaped wheel and is designated 30. This cup-shaped wheel is connected to a part 33 which is provided with teeth 23 as is the cup-shaped wheel of FIGS. 1 to 3. At the transmission to a lower speed, a planet wheel carrier 31 which is rotatably carried by the stationary shaft 19 is connected over a coupling 32 to the coupling member 4, and further to the interior driver member 6. In direct gear, the transmission develops from the cup-shaped wheel 30 over the part 33, a coupling 34, and the coupling member 4 to the interior driver member 6.

Figure 7:
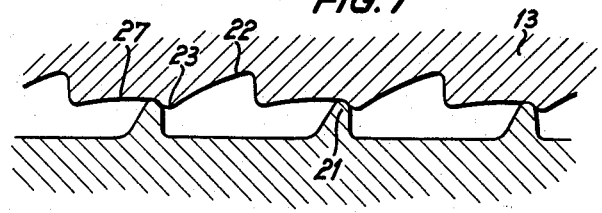
FIG. 7 shows a development of a cam face of a cup-shaped wheel, used instead of the aforesaid respective toothed face, in engagement with noses of a speed-changing member, the position shown corresponding to the showing of FIG. 5.

FIG. 7 is explanatory of the use of cam faces instead of toothed faces. The two cam faces engage each other and rotate together during forward pedaling. Upon backward pedaling, the face containing the projections 21 is axially moved away by the other face rotating in opposite direction.

It is believed that the construction and operation of the dual speed hub of my invention, as well as the many advantages thereof, will be fully understood from the showing of a few forms for practicing the invention, and the foregoing detailed description. Some of the features are reviewed hereinafter. In the case of hubs for direct gear and higher speed gear, particularly simple and advantageous constructions are arrived at when the driver member is formed as a one or multiple part planet wheel carrier of a planetary gearing operating in a single plane, with no part of the gear being laterally shifted for a speed change. In the case of hubs for direct gear and lower speed gear, the driver member is preferably formed as a one or multiple part cup-shaped wheel again of a planetary gearing operating in a single plane, no part of which is laterally moved for the purpose of shifting gears. In the embodiment of FIGS. 1 and 2, the brake cone 8 functions as a lock as does the lock 29 in the construction of FIG. 3.

It will be apparent that while I have shown and described my invention in a few forms only many changes and modifications may be made without departing from the spirit of the invention defined in the following claims.

I claim:

1. Dual speed hub for bicycles and like vehicles, comprising
   (a) a stationary shaft having an axis,
   (b) a driver member rotatable about said shaft in forward and backward directions,
   (c) a hub shell supported to extend coaxially with said shaft for rotation about said axis in said forward and backward directions, and
   (d) power transmission elements engageable to form a power transmission train between said driver member and said hub shell, said elements including
      (1) planetary gearing means having a gear member, (2) a speed-changing member movable in axial direction relative to said gear member,
(3) a coupling member,
(4) an interior driver member,
(5) a face on each of said gear member and said speed-changing member, said faces engaging each other and rotating jointly during forward rotation of said driver member,
(6) said gear member and the face thereon causing axial movement of said speed changing member during backward rotation of said driver member and thus causing said speed-changing member and the face thereon to assume a disengaged position, said coupling member being taken along by said speed-changing member when the latter is axially moved, and
(7) driving means immediately acting upon said hub shell, the power transmission train being formed, depending on the position of said speed-changing member and of the face thereon, either by said driver member, said coupling member, said interior driver member, and said driving means, or by said driver member, said planetary gearing including said gear member, said coupling member, said interior driver member, and said driving means.

2. In the hub according to claim 1, said driving means being constituted by a single aggregate interposed between said interior driver member and said hub shell.

3. In the hub according to claim 1, said driver member being formed as a planet wheel carrier of said planetary gearing means.

4. In the hub according to claim 3, coupling means on said coupling member, first cooperating coupling means on said driver member, and second cooperating coupling means on said gear member, said coupling member being movable from a low speed position to a high speed position and vice versa, said coupling member engaging by said coupling means said first cooperating coupling means in said low speed position, and said second cooperating coupling means in said high speed position.

5. In the hub according to claim 4, said gear member forming a cup-shaped wheel.

6. In the hub according to claim 1, said driver member being formed as a cup-shaped wheel of said planetary gearing means.

7. The hub according to claim 6, further comprising a part connected to said driver member, a planet wheel carrier forming another part of said planetary gearing means, coupling means on said coupling member, first cooperating coupling means on said planet wheel carrier, second cooperating coupling means on said part, said coupling member being movable from a high speed position to a low speed position and vice versa, said coupling member engaging by said coupling means said first cooperating coupling means in said high speed position, and said second cooperating coupling means in said low speed position.

8. In the hub according to claim 1, further comprising coaster brake means including a first and second element, said first element being threadedly connected to said interior driver member to be axially movable, on backward pedaling, against said second element and to cause the latter to perform a braking action upon said hub shell, said coaster brake means further including resilient friction means to prevent said first element, when moving axially, from turning, said driving means releasing said braking action on backward pushing of said vehicle.

9. In the hub according to claim 1, a locking member and an abutment, said locking member being threadedly connected to said interior driver member to be axially movable, on backward pedaling, against said abutment and to prevent a speed change during backward pedaling.

References Cited in the file of this patent

UNITED STATES PATENTS

| | | |
|---|---|---|
| 2,953,945 | Gleasman | Sept. 27, 1960 |
| 3,134,274 | Schwerdhofer | May 26, 1964 |

FOREIGN PATENTS

| | | |
|---|---|---|
| 1,037,891 | Germany | Aug. 28, 1958 |